US005150224A

United States Patent [19]

Mizude et al.

[11] Patent Number: 5,150,224

[45] Date of Patent: Sep. 22, 1992

[54] IMAGE FORMING APPARATUS WITH SELECTABLE AUTOMATIC DOCUMENT SIZE OR COPY PAPER SIZE PRIORITY MODES

[75] Inventors: Kazuhiro Mizude, Osaka; Hirofumi Matsuda, Ibaragi; Haruo Yamamoto, Osaka; Eiichi Tone, Osaka, all of Japan

[73] Assignee: Mita Industrial Co., Ltd., Osaka, Japan

[21] Appl. No.: 755,392

[22] Filed: Sep. 5, 1991

[30] Foreign Application Priority Data

Sep. 26, 1990 [JP] Japan .................................. 2-258172

[51] Int. Cl.5 ...................... H04N 1/393; G03G 15/04

[52] U.S. Cl. .................................... 358/449; 358/451; 355/243; 355/311

[58] Field of Search ............... 358/296, 300, 449, 451; 355/243, 311, 55

[56] References Cited

U.S. PATENT DOCUMENTS 3,689,143 9/1972 Case .................................... 355/243
4,585,332 4/1986 Shenoy ................................ 355/243
4,647,188 3/1987 Komiya et al. ...................... 355/243
4,682,877 7/1987 Fujiwara et al. .................... 355/243
4,835,572 5/1989 Ide ...................................... 355/243
4,920,384 4/1990 Okamoto ............................ 355/243
4,941,017 7/1990 Mishima ............................. 355/243

FOREIGN PATENT DOCUMENTS 0293550 7/1988 European Pat. Off. .
61-180172 4/1986 Japan .

*Primary Examiner*—Benjamin R. Fuller
*Assistant Examiner*—Scott A. Rogers
*Attorney, Agent, or Firm*—Jordan and Hamburg

[57] ABSTRACT

An image forming apparatus includes a document size detection device, a copy paper feeder carrying a plurality of copy paper sheets having different sizes, a copying device for copying an image of the document onto the fed copy paper sheet, the copying means having a copy magnification changer, a copy paper size selector for selecting a desired copy paper size from the plurality of copy paper sizes, a copy magnification setting device for setting a desired copy magnification, a copy mode selection device for selecting either a manual mode or an automatic mode, and a controller for controlling the copy paper feeder and the copy magnification changer so as to execute the manual mode, the automatic mode. The automatic mode has an automatic document size priority sub-mode and an automatic copy paper size priority sub-mode which are changed by actuating the copy paper size selector.

4 Claims, 6 Drawing Sheets

IMAGE FORMING APPARATUS WITH SELECTABLE AUTOMATIC DOCUMENT SIZE OR COPY PAPER SIZE PRIORITY MODES

BACKGROUND OF THE INVENTION AND RELATED ART STATEMENT

This invention relates to an image forming apparatus having a plurality of copy modes which can be desirably selected by the user.

Conventionally, there has been known an image forming apparatus capable of providing three selectable copy modes, that is, automatic document size priority mode, automatic copy paper size priority mode, and manual mode. A desired mode can be selected by a corresponding mode selection key. In the automatic document size priority mode, the size of a document to be copied is initially detected, and copy paper having a size corresponding to the detected document size is automatically selected, and an image of the document is copied onto the selected copy paper. In the automatic copy paper size priority mode, copy paper of a desired size is initially selected by the user, the copy magnification is automatically changed so that the size of the document can correspond to the size of the selected copy paper, and an image of the document is finally copied onto the selected copy paper at the changed copy magnification. In the manual mode, a desired copy paper size and a desired copy magnification are initially selected, and an image of the document is copied onto the selected copy paper at the selected copy magnification.

More specifically, the conventional image forming apparatus is provided with an all-clear key, automatic document size priority mode key, copy magnification setting key, automatic copy paper size priority mode key, and manual mode key. The above-mentioned three copy modes are desirably selected in accordance with a flow chart shown in FIG. 5.

In initial steps, the image forming apparatus is held in the automatic document size priority mode. Specifically, when the all-clear key is turned on (YES in Step S51), or alternatively the copy magnification setting key, automatic copy paper size priority mode key, and manual mode key are turned off (NO in Steps S52, S53, S54), the automatic document size priority mode is held. Also, when the automatic document size priority key is turned on in the automatic copy paper size priority mode or manual mode (YES in Step S61 or S69), the image forming apparatus is set in the automatic document size priority mode. Further, when the all-clear key is turned on in the automatic copy paper size priority mode or manual mode (YES in Step S55 or S64), the image forming apparatus is set in the automatic document size priority mode. In the automatic document size priority mode, as mentioned above, the size of the document is detected, and copy paper having a corresponding size is automatically selected. Thereafter, when a print key is pressed down, the operation is started of copying an image of the document onto the selected copy paper.

When the automatic copy paper size priority mode key is turned on (YES in Step S53 or S70), the image forming apparatus is set in the automatic copy paper size priority mode. Subsequently, a desired copy paper size is selected by the copy paper size selection key (YES in Step S56), and a copy paper feeder is put in a state of being ready to feed a copy paper sheet of the selected size (Step S57), and the copy magnification is automatically changed so that an image of the document can be entirely copied onto the selected copy paper (Step S58). Thereafter, when the print key is pressed down, the copying operation is started.

When the manual mode key is turned on (YES in Step S54 or S62), the image forming apparatus is set in the manual mode. A desired copy paper size is selected by the copy paper size selection key (YES in Step S65), and the copy paper feeder is then put into the state of being ready to feed copy paper of the selected size (Step S66). Subsequently, the copy magnification is changed and set by using the copy magnification setting key (YES in Step S67 and Step S68). Thereafter, when the print key is pressed down, an image of the document is copied onto the selected copy paper at the set copy magnification. Further, if the copy magnification setting key is actuated in the automatic copy paper size priority mode (YES in Step S59), the image forming apparatus is set in the manual mode.

In this conventional image forming apparatus, when selecting a desired copy paper size in the automatic copy paper size priority mode, it is necessary to firstly actuate the automatic copy paper size priority mode key and then actuate the copy paper size selection key. In other words, to select a desired copy paper size, the two keys are required to be actuated. This is cumbersome for the user.

Also, it could be understood that the manual mode is basically different from the other modes, i.e., automatic document size priority mode and automatic copy paper size priority mode in terms of operations of the image forming apparatus. In the automatic document size priority mode, the copying operation is executed based on the document size. Copy paper is automatically selected of having a size corresponding to the document size. In the automatic copy paper size priority mode, the copying operation is executed based on the copy paper size. The copy magnification is automatically changed so that an image of the document can be entirely copied onto copy paper of the selected size. However, in the manual mode, a desired copy paper size and a desired copy magnification are firstly set by the user. The copying operation is carried out in accordance with the set copy paper size and copy magnification. In other words, in the automatic document size priority mode and automatic copy paper size priority mode, one copying condition is initially determined, that is, either the document size or the copy paper size. In the manual mode, on the other hand, two copy conditions are initially required to be determined, that is, both the copy magnification and the copy paper size. Accordingly, the three modes are basically sorted into two operation manners, i.e., automatic operation manner and manual operation manner.

However, in the conventional apparatus, the three mode setting keys respectively corresponding to the three copy modes are individually disposed. This disposition of the three mode setting keys does not correspond to the above-mentioned two basic operation manners. For this reason, it will take a considerable time for the user to learn specific operations of each copy mode. Also, the conventional image forming apparatus, because of the three mode setting keys, causes cumbrous mode setting operation to the user. Further, erroneous key operation is liable to occur due to the large number of mode setting keys, consequently causing a greater number of copied paper sheets to be wasted. Moreover, the large number of mode setting keys result in higher production costs.

Accordingly, there has been earnestly demanded an image forming apparatus which has a smaller number of mode setting keys, and further has a key arrangement corresponding to the two basic operation manners.

SUMMARY OF THE INVENTION

In view of the above-mentioned drawbacks, it is an object of the present invention to provide an image forming apparatus having a smaller number of mode setting keys.

It is another object of the present invention to provide an image forming apparatus having a key arrangement corresponding to the two basic operation manners.

An image forming apparatus of the present invention comprises document holder means for holding a document, document size detection means for detecting the size of the document, copy paper feeder means carrying a plurality of copy paper sheets having different sizes for feeding a copy paper sheet, copying means for copying an image of the document onto the fed copy paper sheet, the copying means including a copy magnification changer, copy paper size selection means for selecting a desired copy paper size from the plurality of copy paper sizes, all-clear means, and control means for controlling the copy paper feeder means and the copy magnification changer so as to clear the previously set copying condition and execute an automatic document size priority mode when the all-clear means is actuated, and to execute an automatic copy paper size priority mode when the copy paper size selection means is actuated, the automatic document size priority mode being that the copy paper feeder and the copy magnification changer are controlled so that the document image is copied onto a copy paper sheet corresponding to the document size at a life size magnification, and the automatic copy paper size priority mode being that the copy paper feeder and the copy magnification changer are controlled so that the image is copied onto a selected copy paper sheet at an appropriately changed copy magnification.

With this construction, when the all-clear means is actuated, the image forming apparatus is set in the automatic document size priority mode. When the copy paper size selection means is actuated, the image forming apparatus is set in the automatic copy paper size priority mode at the same time when a desired copy paper size is selected by the copy paper size selection means. Accordingly, the automatic copy paper size priority mode and the desired copy paper size are selected by actuating the copy paper size selection means one time only.

Another image forming apparatus of the present invention comprises document holder means for holding a document, document size detection means for detecting the size of the document, copy paper feeder means carrying a plurality of copy paper sheets having different sizes for feeding a copy paper sheet, copying means for copying an image of the document onto the fed copy paper sheet, the copying means including a copy magnification changer, copy paper size selection means for selecting a desired copy paper size from the plurality of copy paper sizes, copy magnification setting means for setting a desired copy magnification, copy mode selection means for selecting either a manual mode or an automatic mode, and control means for controlling the copy paper feeder means and the copy magnification changer so as to execute the manual mode when the manual mode is selected, and execute the automatic mode when the automatic mode is selected, the manual mode being that a user is permitted to select a copy paper sheet of a desired size and a desired copy magnification, and the copy paper feeder and the copy magnification changer are controlled so that the document image is copied onto the selected copy sheet at the selected copy magnification, the automatic mode having an automatic document size priority sub-mode and an automatic copy paper size priority sub-mode, the automatic document size priority sub-mode being selected immediately by selecting the automatic mode, the automatic copy paper size priority sub-mode being selected by selecting the automatic mode and actuating the copy paper size selection means, the automatic document size priority sub-mode being that the copy paper feeder and the copy magnification changer are controlled so that the document image is copied onto a copy paper sheet corresponding to the document size at a life size magnification, and the automatic copy paper size priority sub-mode being that the copy paper feeder and the copy magnification changer are controlled so that the document image is copied onto a selected copy paper sheet at an appropriately changed copy magnification.

With this construction, either the manual mode or the automatic mode is firstly selected by the copy mode selection means. In the automatic mode, either the automatic copy paper size priority sub-mode or the automatic document size priority sub-mode is selected by actuating the copy paper size selection means or not. In other words, selection of the copy mode is executed in accordance with the above-mentioned two basic operation manners, which can consequently assure easier copy mode setting, and also reduce the number of setting keys.

Also, the copy mode selection means may comprise a manual mode key for setting the manual mode and an automatic mode key for setting the automatic mode, the copy magnification setting means and the copy paper size selection means being forcibly set in their respective initial states when the automatic mode key is actuated.

With this construction, at the same time that the automatic mode key is actuated, the copy magnification setting means and the copy paper size selection means are forcibly set in their respective initial states. Accordingly, the automatic document size priority mode can be immediately started, which can increase the copying efficiency.

Further, the copy mode selection means may comprise a switch device changeable from ON-state to OFF-state and vice versa, the manual mode being executed when the switch is in the ON-state, and the automatic mode being executed when the switch is in the OFF-state.

With this construction, when the copy mode selection means is in the OFF-state, i.e., the usual state, the automatic mode, which has a high frequency in use, is executable. Accordingly, copy mode setting can be practiced more efficiently. Also, either the automatic mode or the manual mode is selected merely by changing the switch device from the ON-state to the OFF-state and vice versa. Consequently, copy mode selection can be accomplished with the use of one setting key only, which can thus reduce the number of setting keys and production costs.

The above and other objects, features and advantages of the present invention will become more apparent upon a reading of the following detailed description and drawings.

DETAILED DESCRIPTION OF PREFERRED EMBODIMENT OF THE INVENTION

Figure 2:
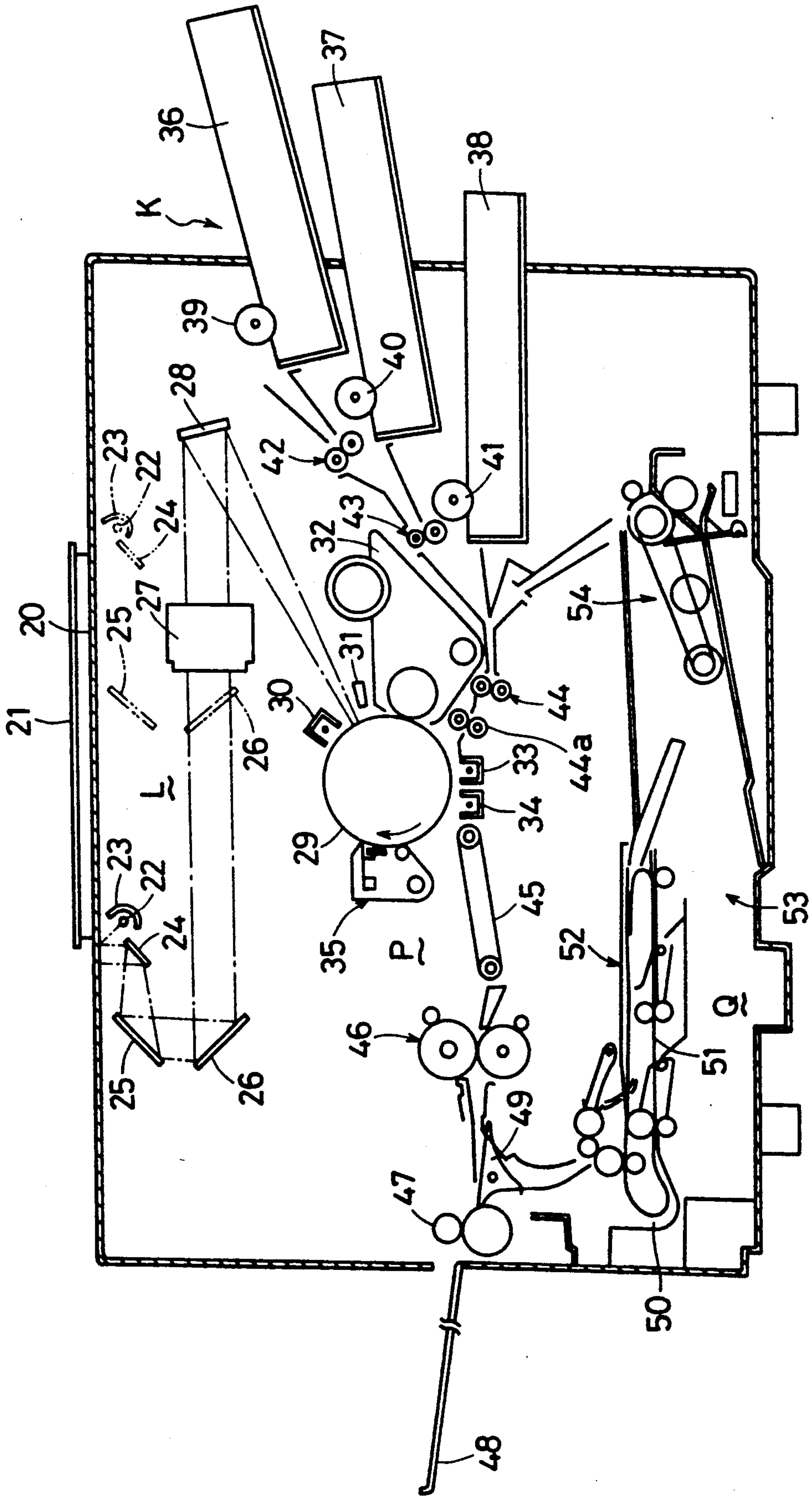
FIG. 2 is a diagram schematically showing a construction of the image forming apparatus.

FIG. 2 is a schematic diagram showing an image forming apparatus embodying the invention. The image forming apparatus comprises in an upper portion thereof a contact glass 20 and a document presser 21. Further, the image forming apparatus is internally provided with an optical system L, an image forming assembly P, and a refeeding assembly Q.

The optical system L comprises a light source having a halogen lamp 22 and a reflector 23, reflecting mirrors 24, 25, and 26, a copy magnification changer 27 having a lens, and a fixed mirror 28. When a document is placed on a specified position of the contact glass 20 and scanning of the document is started, the document placed on the contact glass 20 is illuminated by light from the light source. The reflected light from the document is introduced to the copy magnification changer 27 by way of the reflecting mirrors 24 to 26. A portion of a surface of a photosensitive drum 29 to be described below is exposed to the light from the fixed mirror 28. The light image is magnified or contracted by the copy magnification changer 27 according to need.

The image forming assembly P comprises the photosensitive drum 29, a charger 30, a blank lamp 31, a developing device 32, a transfer device 33, a separation device 34, and a cleaning device 35. The surface of the photosensitive drum 29 is charged by the charger 30, and exposed to the reflected light so that a latent image is formed. The latent image is developed with toner by the developing device 32. The toner image is thereafter transferred by the transfer device 33 onto a copy paper sheet, which is in turn separated from the photosensitive drum 29 by the separation device 34.

Further, there is provided a copy paper feeder assembly K including cassettes 36, 37, 38 carrying copy paper sheets having different sizes, e.g., SIZE A-3, SIZE A-4, feed rollers 39, 40, 41, register roller pairs 42, 43, 44, and a secondary feed roller pair 44*a* arranged in this order from upstream of the feed direction of copy paper sheet. A copy paper sheet of a desired size is selected and fed to the photosensitive drum 29 by the copy paper feeder assembly K. An image of the document is transferred onto the fed copy paper sheet. Also, the cleaning device 35 is adapted for removing the toner residual on the surface of the photosensitive drum 31 after each transferring operation.

Downstream of the photosensitive drum 31 with respect to the feed direction of copy paper sheet are provided a transport belt 45, a fixing device 46 and a discharge roller pair 47. After passing through the transferring operation, the toner image is fixed onto the copy paper sheet by the fixing device 46. The copy paper sheet is then discharged to a discharge tray 48 or transported to the refeeding assembly Q.

The refeeding assembly Q comprises a switching guide 49, a guide portion 50, a reversing belt 51 for reversing the feed direction of copy paper sheet, a reversing guide portion 52, an intermediate tray 53, and a refeeding mechanism 54.

In the case that a duplex copy mode is selected, an image is transferred onto the front surface of a fed copy paper sheet which is in turn transported through the switching guide 49 to the reversing guide portion 52 by the reversing belt 51. The reversing belt 51 has its moving direction reversed, so that the copy paper sheet is transported to the intermediate tray 53 through the guide portion 50 and temporarily retained therein. Thereafter, a next document is placed on the contact glass 20 and a print key 101 to be mentioned later is turned on, the copy paper sheet retained in the intermediate tray 53 is fed to the photosensitive drum 29 by the refeeding mechanism 54 in synchronization with the copying operation. After an image of the next document is transferred onto the rear surface of the refed copy paper sheet and then fixed by the fixing device 46. Subsequently, the copy paper sheet is discharged to the discharge tray 48 through the discharge roller pair 47.

Figure 1:
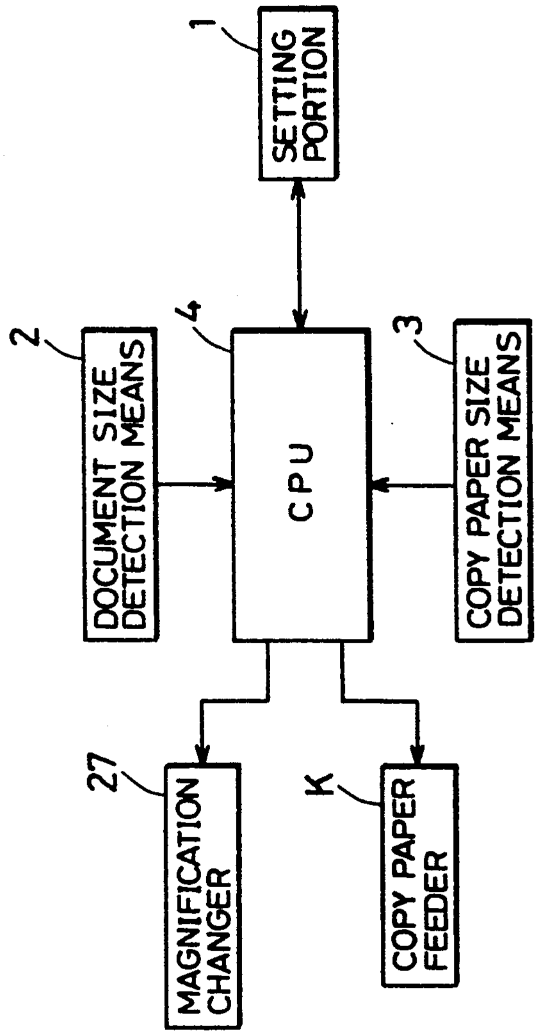
FIG. 1 is a block diagram showing a control system of an image forming apparatus embodying the present invention.
Figure 3:
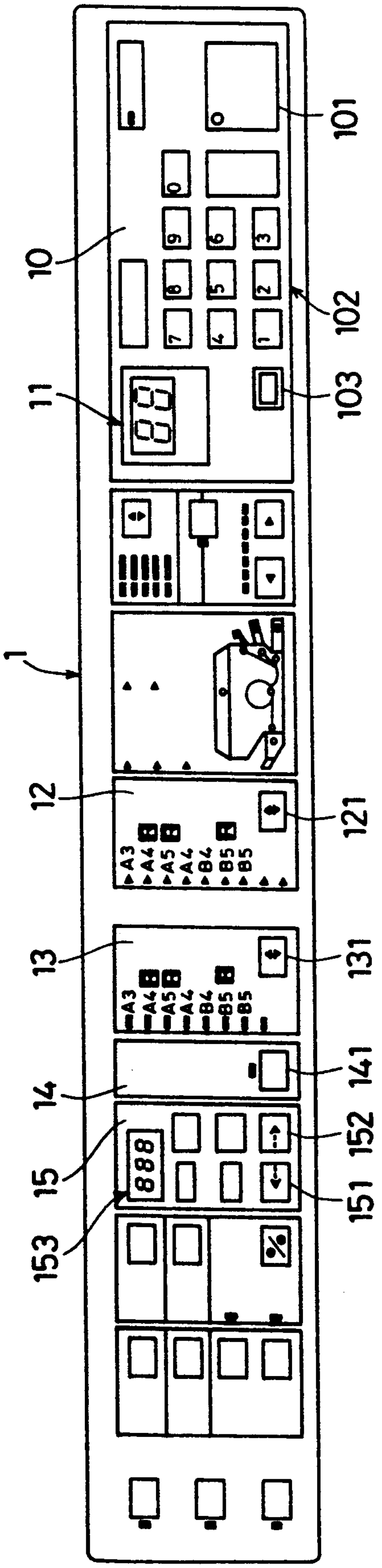
FIG. 3 is an illustration showing a copy mode setting portion of the image forming apparatus.

Next, referring to FIG. 1 showing a control system of the image forming apparatus, indicated at 1 is a setting portion including setting keys for various operations and displays as shown in FIG. 3. Set data is sent to a central processing unit (CPU) 4.

Indicated at 2 is document size detection means for detecting the size of a document before start of the copying operation. Specifically, the document size detection means includes a plurality of light emitters and the same number of light receptors corresponding to the light emitters. All of the emitters and receptors are disposed under the contact glass 20. A pair including one light emitter for emitting light to the document and one light receptor for receiving light reflected from the document constitute one detector to detect the document size.

For example, to discriminate four sorts of copy paper sheets, e.g., A-3 and A-4 of Copy Paper Size Series A, B-4 and B-5 of Copy Paper Size Series B having a different standard from Series A, A-4 copy paper having a half of A-3 copy paper, and B-5 copy paper having a half size of B-4 copy paper, two detectors are provided at appropriate positions. Specifically, one detector is provided at a position corresponding to an edge of a B-4 copy paper sheet to discriminate a B-4 copy paper sheet and a B-5 copy paper sheet. Another detector is provided at a position corresponding to an edge of an A-4 copy paper sheet to discriminate an A-3 copy paper sheet and an A-4 copy paper sheet.

Alternatively, the document size detection means 2 may be constructed by means for prescanning the document to provide an image signal, and calculating the outline of the document based on the image signal, and determining the document size based on the calculated outline. Also, the document size detection means 2 may be constructed by other appropriate means.

Indicated at 3 is copy paper size detection means for detecting the size of copy paper sheet. The copy paper size detection means 3 includes magnet markers provided on the respective cassettes 36, 37, 38 and having identifications for identifying respective sizes of copy paper sheets accommodated in the cassettes 36, 37, 38, and sensors for detecting the identifications. The sensors are provided at such positions of the image forming apparatus as to face the respective magnet markers when the cassettes are attached to the image forming apparatus. The sensor includes, for example, a magnetic switch. The copy paper size detection means 3 detects the size of copy paper sheets accommodated in the cassette and sent the detected size to the CPU 4.

The CPU 4 controls the copy magnification changer 27 and the copy paper feeder assembly K in accordance with copying conditions set by the setting portion 1, the document size from the document size detection means 2, and the copy paper size from the copy paper size detection means 3.

The image forming apparatus, constructed as mentioned above, can execute three copy modes: A manual mode in which a desired copy paper size and a desired copy magnification are initially set, and an image of the document is copied onto a copy paper sheet of the set size at the set copy magnification; An automatic document size priority mode in which the size of a document is firstly automatically detected, and a copy paper sheet having a size corresponding to the detected document size is automatically selected, and an image of the document is copied onto the selected copy paper sheet; and An automatic copy paper size priority mode in which a desired copy paper size is initially set by the user, the copy magnification is automatically changed so that the size of the document can correspond to the set copy paper size, and an image of the document is copied onto the copy paper sheet of the set size.

Among the three copy modes, a desired copy mode is selected or set by the setting portion 1 to be described in detail below with reference to FIG. 3.

Indicated at 10 is a basic copy condition input section 10 including the print key 101, a ten key array 102, an all-clear key 103, and a display 11. The print key 101 is adapted for starting the copying operation. The ten key array 102 is adapted for setting the number of copy paper sheets to be required for each document. The all-clear key 103 is adapted for clearing previously set copy conditions and setting the automatic document size priority mode. When the all-clear key 103 is turned on, the automatic document size priority mode is set. The display 11 is adapted for indicating the number of copy paper sheets for each document which is set by way of the ten keys array 102.

Indicated at 12 is a copy paper size selection section including a cassette selection key 121. A desired copy paper size is selected by designating the cassette carrying copy paper sheets of a desired size by the cassette selection key 121. When the cassette selection key 121 is actuated in the automatic document size priority mode, the image forming apparatus is set in the automatic copy paper size priority mode.

Indicated at 13 is a document size input section including a document size inputting key 131. In the manual mode, a document size is input with the document size inputting key 131 by the user. Also, there is provided an array of document size indicators for indicating the document size input by the user in the manual mode or automatically detected in the automatic mode.

Indicated at 14 is a copy mode selection section including a copy mode selection key 141. When the copy mode selection key 141 is turned on, the manual mode is set. On the other hand, when the copy mode selection key 141 is turned off, the automatic document size priority mode is set.

Indicated at 15 is a copy magnification setting section including magnification setting keys 151 and 152. A desired copy magnification is set by manipulating the magnification setting keys 151 and 152. The copy magnification is changed by moving the lens of the copy magnification changer 27 in a predetermined way. There is provided a display 153 for indicating the set copy magnification.

Figure 4:
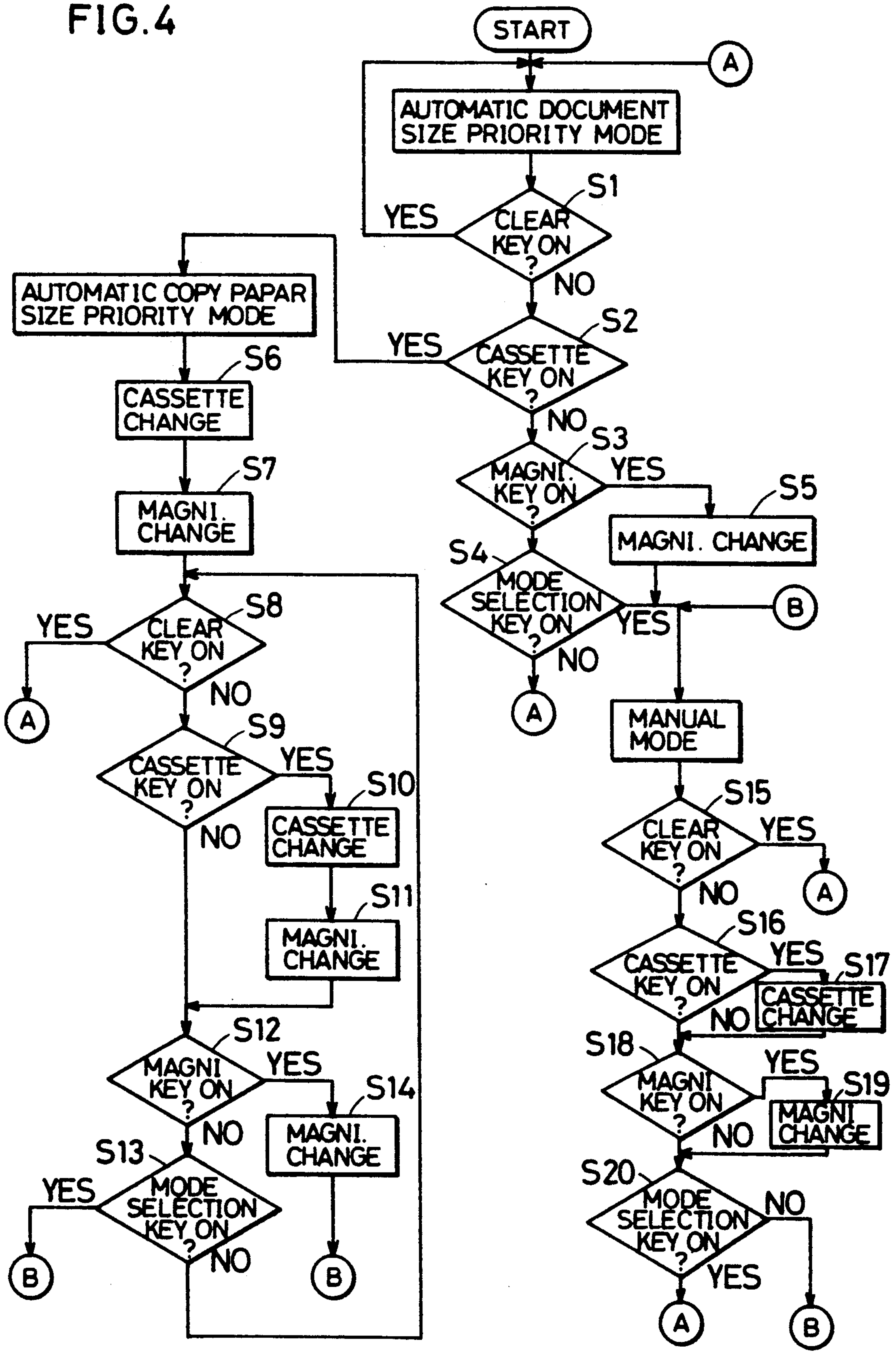
FIG. 4 is a flow chart showing an operation routine of the image forming apparatus.
Figure 5A:
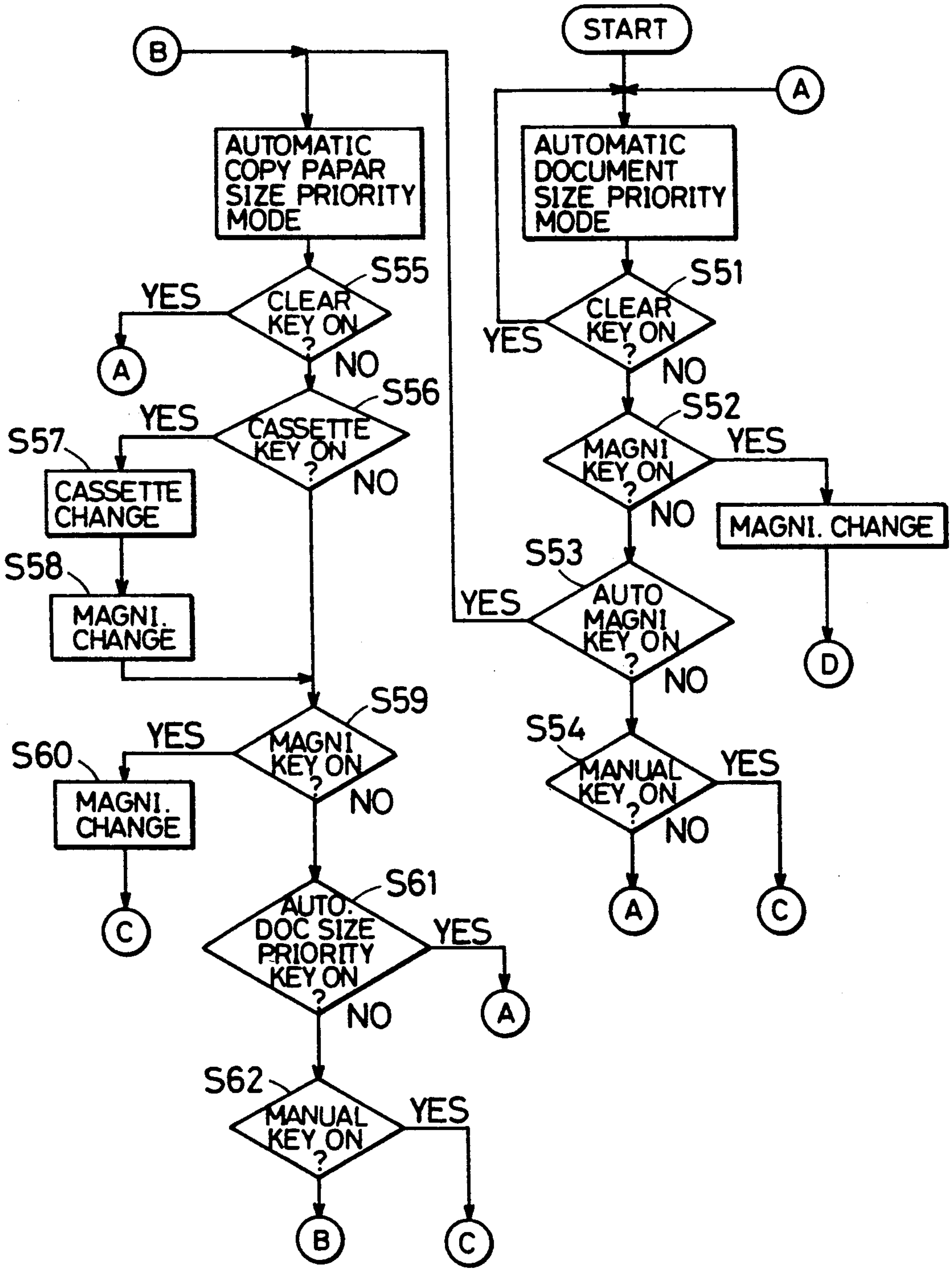
PRIOR ART FIG. 5A
FIGS. 5A and 5B are flow charts combinedly showing an operation routine of a conventional image forming apparatus.
Figure 5B:
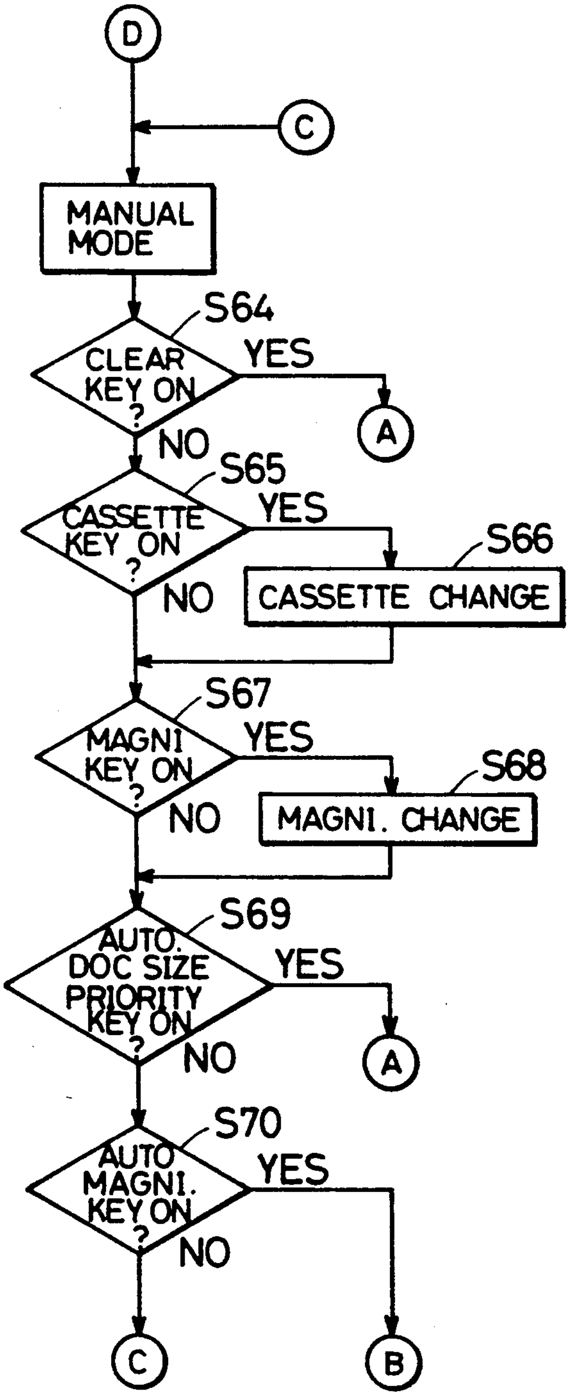
PRIOR ART FIG.5B

Next, the copy mode selection of the image forming apparatus will be described with reference to FIG. 4.

When a power switch is turned on, the image forming apparatus is set in the automatic document size priority mode, that is, the initial state. In Step S1, it is discriminated whether the all-clear key 103 is turned on. When the all-clear key 103 is turned on, the routine returns to the initial state. When the all-clear key 103 is not turned on (NO in Step S1), the routine proceeds to Step S2 in which it is discriminated whether the cassette selection key 121 is actuated. When the cassette selection key 121 is not actuated (NO in Step S2), the routine proceeds to Step S3 in which it is discriminated whether the copy magnification setting keys 151, 152 are actuated. When the copy magnification setting keys 151, 152 are not actuated (NO in Step S3), the routine proceeds to Step S4 in which it is discriminated whether the mode selection key 141 is turned on. When the mode selection key 141 is not turned on (NO in Step S4), the routine returns to the initial state, so that the automatic document size priority mode is held.

On the other hand, when the copy magnification setting keys 151, 152 are actuated (YES in Step S3), the lens of the copy magnification changer 27 is moved so as to obtain the set copy magnification in Step S5. Thereafter, the routine proceeds into the manual mode. Also, when the mode selection key 141 is turned on (YES in Step S4), the routine proceeds into the manual mode.

When the cassette selection key 121 is actuated to set a desired copy paper size (YES in Step S2), the routine proceeds into the automatic copy paper size priority mode. Specifically, in Step S6, the cassette carrying copy paper sheets of the set size is put into a standby state of being ready to feed a copy paper sheet of the set size, and in Step S7, the copy magnification is changed so that the size of the document can correspond to the set copy paper size. The size of the document is detected by the document size detection means 2. Thereafter, when the print key 101 is pressed down, the copying operation is executed.

Next, the routine proceeds to Step S8 in which it is discriminated whether the all-clear key 103 is turned on. When the all-clear key 103 is not turned on (NO in Step S8), the routine proceeds to Step S9 in which it is discriminated whether the cassette selection key 121 is actuated to set another copy size. When the cassette selection key 121 is actuated (YES in Step S9), the routine proceeds to Step S10 in which the cassette carrying copy paper sheets of the another size is put into the standby state of being ready to feed a copy paper sheet of the set size, and in Step S11, the copy magnification is changed so that the document can be entirely copied onto the selected copy paper sheet.

When the cassette selection key 121 is not actuated (NO in Step S9), on the other hand, the routine proceeds to Step S12 in which it is discriminated whether the copy magnification setting keys 151, 152 are actuated. When they are not actuated (NO in Step S12), the routine proceeds to Step S13 in which it is discriminated whether the mode selection key 141 is turned on. When the mode selection key 141 is not turned on (NO in Step S13), the routine returns to Step S8.

When the copy magnification setting keys 151, 152 are actuated (YES in Step S12), the routine proceeds to Step S14 in which the lens of the copy magnification changer 27 is moved so as to attain the set copy magnification, and proceeds into the manual mode. Also, when the mode selection key 141 is turned on (YES in Step S13), the routine proceeds into the manual mode.

In the manual mode, in Step S15, it is discriminated whether the all-clear key 103 is turned on. When the all-clear key 103 is turned on (YES in Step S15), the routine proceeds into the initial state. On the other hand, when the all-clear key 103 is not turned on (NO in Step S15), the routine proceeds to Step S16 in which it is discriminated whether the cassette selection key 121 is actuated to set a desired copy paper size.

When the cassette selection key 121 is actuated (YES in Step S16), the routine proceeds to Step S17 in which the cassette carrying copy paper sheets of the set size is put into the standby state of being ready to feed a copy paper sheet of the set size. On the other hand, when the cassette selection key 121 is not actuated (NO in Step S16), the routine proceeds to Step S18 in which it is discriminated whether the copy magnification setting keys 151, 152 are actuated. When they are actuated (YES in Step S18), the copy magnification is changed by the copy magnification changer 27. When they are not actuated (NO in Step S18), the routine proceeds to Step S20 in which it is discriminated whether the mode selection key 141 is turned on. When the mode selection key 141 is not turned on (NO in Step S20), the routine returns to Step S15. When the mode selection key 141 is actuated (YES in Step S20), the routine returns to the initial state.

As described above, the automatic copy paper size priority mode is set at the same time when a desired copy paper size is set by actuating the cassette selection key 121. Accordingly, the automatic copy paper size priority mode and the desired copy paper size, which is required to be set in the automatic copy paper size priority mode, can be set at the same time, thus reducing the time for setting copying conditions.

Also, either the manual mode or the automatic document size priority mode is selected or set by turning on or off the mode selection key 141. The automatic copy paper size priority mode is selected or set by actuating the cassette selection key 121 when the image forming apparatus is set in the automatic document size priority mode. Accordingly, the copy mode selection can be practiced in accordance with the two basic operation manners. Also, two copy modes can be selectively set by actuating only one key, i.e., the mode selection key 141, which consequently assures easier copy mode setting and reduces the number of setting keys.

Further, the automatic document size priority mode, which has high frequency in use, is held when the mode selection key 141 is turned off. Copy mode selection can be practiced at higher efficiency.

Moreover, it may be appropriate that the mode selection key 141 is made to perform the function of the all-clear key 103 in addition to the primary function of selecting a copy mode, so that the all-clear key 103 can be eliminated. Thus, the number of setting keys can be reduced.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. An image forming apparatus comprising:

document holder means for holding a document;

document size detection means for detecting the size of the document;

copy paper feeder means carrying a plurality of copy paper sheets having different sizes for feeding a copy paper sheet;

copying means for copying an image of the document onto the fed copy paper sheet, the copying means including a copy magnification changer;

copy paper size selection means for selecting a desired copy paper size from the plurality of copy paper sizes;

all-clear means for clearing a previously set copy condition and setting an automatic document size priority mode; and control means for controlling the copy paper feeder means and the copy magnification changer to clear a previously set copy condition and execute the automatic document size priority mode in response to actuation of the all-clear means, and to execute an automatic copy paper size priority mode when the copy paper size selection means is actuated, said control means comprising means, in said automatic document size priority mode, to control said copy paper feeder to select a copy paper size independently of document size detection means and to control the copy magnification changer to copy the document image onto the selected copy paper sheet corresponding to the document size at a life size magnification, said control means further comprising means, in the automatic copy paper size priority mode, to control said copy paper feeder to select a copy paper size in dependence upon the document size detection means and to control the copy magnification changer to copy the document image onto the selected copy paper sheet with a copy magnification that is dependent upon the document size detection means.

2. An image forming apparatus comprising:

document holder means for holding a document;

document size detection means for detecting the size of the document;

copy paper feeder means carrying a plurality of copy paper sheets having different sizes for feeding a copy paper sheet;

copying means for copying an image of the document on the fed copy paper sheet, the copying means including a copy magnification changer;

copy paper size selection means for selecting a desired copy paper size from the plurality of copy paper sizes;

copy magnification setting means for setting a desired copy magnification;

copy mode selection means for selecting either a manual mode or an automatic mode; and control means for controlling the copy paper feeder means and the copy magnification changer to execute the manual mode when the manual mode is selected, and to execute the automatic mode when the automatic mode is selected, said control means comprising means, in the manual mode, to permit a user to select a copy paper sheet of a desired size and to select a desired copy magnification, and to control the copy paper feeder and the copy magnification changer to copy the image onto the selected copy sheet at the selected copy magnification, the automatic mode having an automatic document size priority sub-mode and an automatic copy paper size priority sub-mode, said control means comprising means to immediately select the automatic document size priority sub-mode upon selection of the automatic mode, said control means comprising means for selecting the automatic copy paper size priority sub-mode in response to selection of the automatic mode and actuation of said copy paper size selection means, said control means comprising means, in the automatic document size priority sub-mode, to control said copy paper feeder to select a copy paper size independently of said document size detection means and to control the copy magnification changer to copy the document image onto the selected copy paper sheet corresponding to the document size at a life size magnification, said control means further comprising means, in the automatic copy paper size priority sub-mode, to control said copy paper feeder to select a copy paper size in dependence upon the document size detection means and to control the copy magnification changer to copy the document image onto a selected copy paper sheet with a magnification that is dependent upon the document size detection means.

3. An image forming apparatus as defined in claim 2 wherein the copy mode selection means includes a manual mode key for setting the manual mode and an automatic copy mode key for setting the automatic mode, and means for forcibly setting the copy magnification setting means and the copy paper size selection means in their respective initial states when the automatic mode key is actuated.

4. An image forming apparatus as defined in claim 2 wherein the copy mode selection means includes a switch device changeable from ON-state to OFF-state and vice versa, means for executing the manual mode when the switch device is in the ON-state, and means for executing the automatic mode when the switch device is in the OFF-state.

* * * * *